United States Patent [19]
McCormack

[11] Patent Number: 4,836,495
[45] Date of Patent: Jun. 6, 1989

[54] RETAINER MOLD FOR FORMING FOAMED AUTOMOTIVE ARTICLES

[75] Inventor: Joseph A. McCormack, Dover, N.H.
[73] Assignee: Davidson Textron Inc., Dover, N.H.
[21] Appl. No.: 255,503
[22] Filed: Oct. 11, 1988
[51] Int. Cl.[4] .............. B29C 33/12; B29C 33/76; B29C 39/26
[52] U.S. Cl. .................... 249/83; 249/122; 249/142; 249/151; 249/155; 249/177; 425/522; 425/817 R
[58] Field of Search ............ 249/83, 85, 127, 142, 249/151, 122, 155; 425/522, 4 R, 817 R

[56] References Cited

U.S. PATENT DOCUMENTS

| | | | |
|---|---|---|---|
| 1,191,637 | 7/1916 | Whitely | 249/83 |
| 1,309,084 | 7/1919 | Zimmerman | 249/177 |
| 2,113,445 | 4/1938 | Estep | 249/83 |
| 4,260,576 | 4/1981 | Pollard | 264/257 |

*Primary Examiner*—Willard Hoag
*Attorney, Agent, or Firm*—John P. Moran; John C. Evans

[57] ABSTRACT

A retainer mold for forming foamed automotive articles, particularly instrument panels, after a thin vinyl skin shell has been mounted in the mold. The mold includes a plurality of die block assemblies mounted in recesses formed in a surface of the mold cavity. Each die block assembly includes a plate member secured in the recess, and a die block slidably mounted within controlled limits on the plate member, and adapted to be covered by the shell and to be moved as required to prevent wrinkling or bridging of the portion of the shell extending between adjacent die blocks.

6 Claims, 2 Drawing Sheets

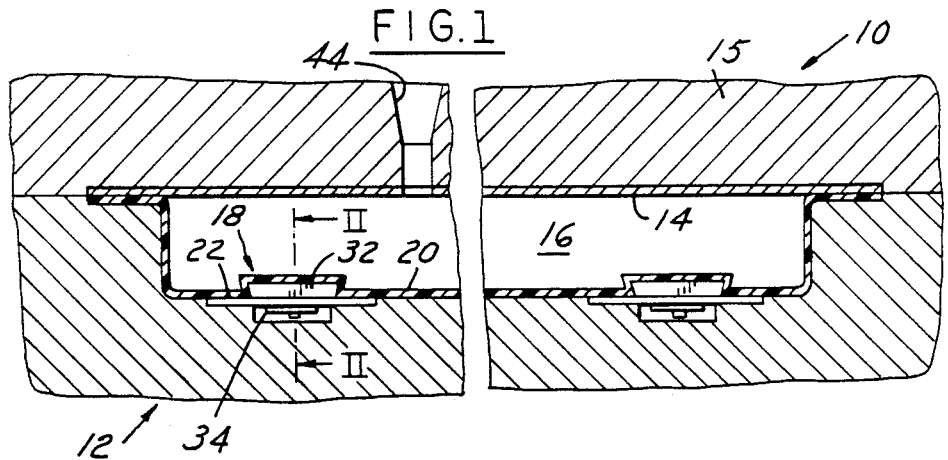
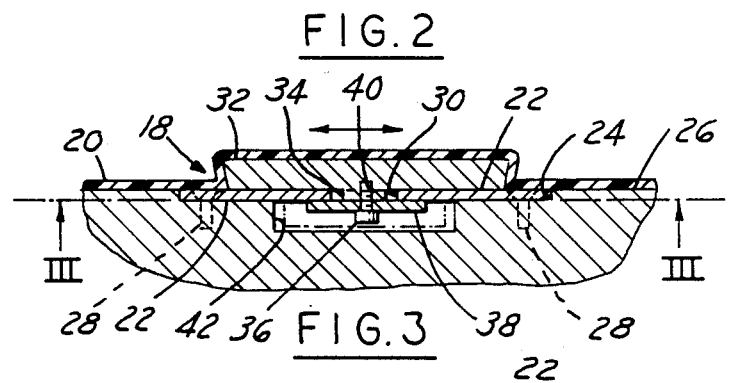
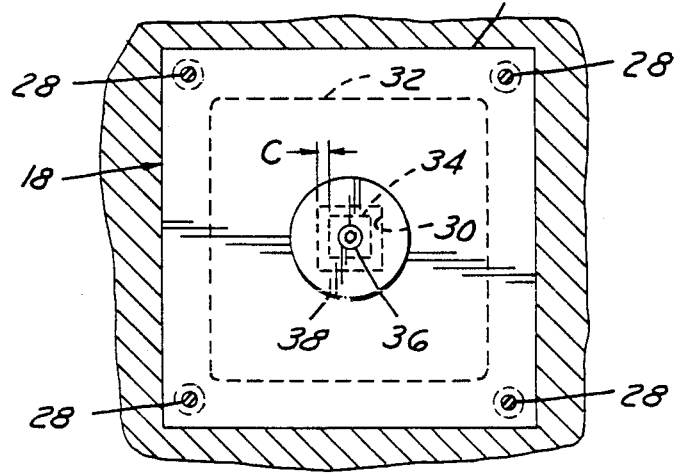

RETAINER MOLD FOR FORMING FOAMED AUTOMOTIVE ARTICLES

TECHNICAL FIELD

This invention relates generally to retainer type mold assemblies and, more particularly, to mold assemblies having floating die block sub-assemblies therein to compensate for dimensional variations in plastisol or vinyl skin shells typically placed in the mold to form the outer layer of interior automobile components, such as instrument panels, and the like.

BACKGROUND ART

Molded foam interior automobile components typically consist of a foam layer, such as polyurethane foam between an outer thin decorative vinyl skin and a rigid plastic insert on the back side thereof. For such articles, the thin vinyl skin is first formed in a slush molding process, and then manually placed in a retainer mold, wherein a liquid polyurethane is poured through an inlet opening formed in the mold and the rigid insert into the predetermined cavity above the thin vinyl skin, to leave a space therebetween for the liquid polyurethane to foam and expand between the vinyl skin and the insert in the usual manner.

It is well known in the manufacture of molded automobile instrument panels to use die blocks of predetermined shapes in the mold at selected locations coinciding with locations on the foam article being molded where openings, such as air conditioning outlets, are to be formed on the finished product.

Heretofore, where die blocks have been included in mold assemblies they have been rigidly secured therein, resulting, at times, in wrinkling or bridging of the typical vinyl skin, due to expansion or contraction occurring between die blocks during the foam molding process, or due to variations in tolerances in different slush molds used to form the vinyl skins prior to their being mounted in the retainer mold.

DISCLOSURE OF THE INVENTION

A general object of the invention is to provide improved means within a retainer mold for compensating for vinyl skin shells which vary in size, so as to prevent wrinkling and/or bridging between die-locked details of the respective shells.

Another object of the invention is to provide an improved die block arrangement for assuring the proper fit of vinyl skin shells within retainer molds.

A further object of the invention is to provide a floating die block assemblies including floating die blocks within a retainer mold for preventing wrinkling of vinyl skin shells which have been formed in a preceding molding operation to the high side of predetermined tolerances, and preventing bridging of shells which have been previously formed to the low side of predetermined tolerances.

These and other objects and advantages of the invention will become more apparent when reference is made to the following drawings and the accompanying description.

BRIEF DESCRIPTION OF THE DRAWINGS

FIG. 1 is a sectional view of a retainer mold embodying the invention;

FIG. 2 is an enlarged view of the inventive portion of the FIG. 1 structure;

FIG. 3 is a view taken along the plane of the line 3—3 of FIG. 2, as if FIG. 2 were a full figure, and looking in the direction of the arrows;

BEST MODE FOR CARRYING OUT THE INVENTION

Figure 4:
FIGS. 4 and 5 are enlarged fragmentary views of the mold of FIG. 1 illustrating prior art operational characteristics.

Referring now to the drawings in greater detail, FIG. 1 illustrates a retainer mold assembly 10, such as may be used to form an automotive instrument panel, including at least one pour mold 12 which, in conjunction with an insert 14 just beneath a mold cover 15, defines a mold cavity 16. A plurality of floating die block subassemblies 18 are mounted at predetermined locations in the mold 12. A vinyl skin shell 20 is manually mounted within the mold, and on and around the exposed portion of each floating die block subassembly 18. The shell 20 typically is of a grained thermoplastic material having a thickness on the order of 0.015 to 0.090 inches.

As shown in FIGS. 2 and 3, each floating die block subassembly 18 includes a square retainer plate 22 mounted in a first recess 24 formed in the inner surface 26 of the mold assembly 10, and retained therein by fasteners, such as flat head screws 28. A square opening 30 of a predetermined size is formed at the center of the retainer plate 22.

A floating block 32, having a slightly inwardly tapered peripheral edge, is slidably mounted on the fixed retainer plate 22 and includes a square extension or boss 34 centrally formed on the retainer plate side thereof for a length slightly greater than the thickness of the retainer plate 22. The square extension 34 extends into the square opening 30, such that an initial clearance "C" of a width equal to the tolerance allowed in the finished product, such as ± one millimeter, exists on each of the four sides thereof. The clearance is preferably square in shape to accommodate primarily linear, and to some extent angular, misalignment between locations on respective vinyl skins for subsequent openings to be formed in the finished product, such as the instrument panel. The floating blocks 32 generally conform in shape to details in the finished product and are located at the approximate centers of the respective openings to be formed in the adjacent vinyl skin.

The floating block 32 is slidably retained on the retainer plate 22 by a suitable screw 36 extended through a flat washer 38 and threadedly connected to a threaded opening 40 formed in the extension 34 and the floating block 32. The screw 36 and the flat washer 38 are mounted in a second recess 42 formed in the mold assembly 10 concentric with the first recess 24, the flat washer substantially abutting against the adjacent extension 34 surface and clearing slightly the surface of retainer plate 22.

Figure 5:
Figure 6:
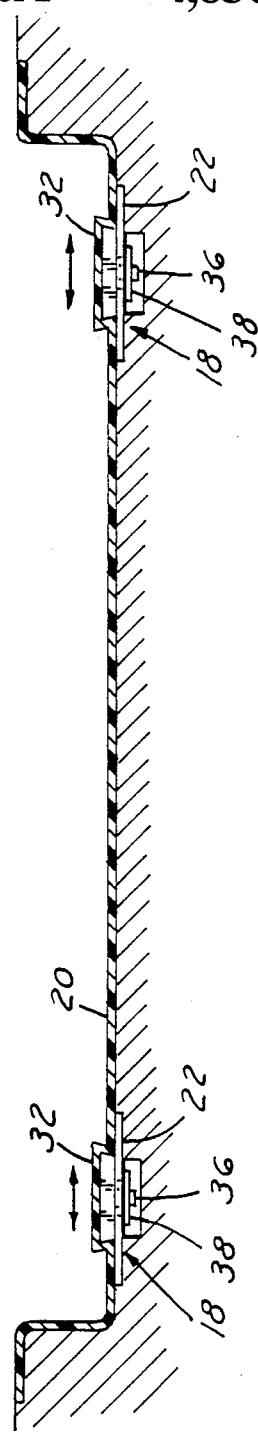
FIG. 6 is an enlarged fragmentary view of the mold of FIG. 1 illustrating the operational characteristics of the invention.

The screw 36 is tightened to a limit which permits the floating block 32 to move the distance of the clearance C, as required to compensate for dimensional variations in vinyl skin shells 20 which have been formed in a plurality of prior slush molding operations, wherein different molds vary in size due to allowable manufacturing tolerances. By virtue of the clearances C, wrinkling or stretching or bridging of the variably sized shells 20, as represented in the prior art FIGS. 4 and 5 is prevented. More specifically, the floating blocks 32 are moved laterally as required to cause the particular shell 20 to fit around spaced blocks 32 as shown in FIG. 6, i.e., with the portion of the shell therebetween extending in a smooth, unwrinkled or unbridged manner.

Thereafter, polyurethane foam is injected through the inlet 44 into the cavity 16, wherein the foam expands to fill the cavity and to become integrally secured to the vinyl shell 20, forming the instrument panel which may then be removed from the mold assembly 10. In the removal process, the shell 20 is flexible enough to spread from around the slightly inwardly tapered bocks 32.

INDUSTRIAL APPLICABILITY

It should be apparent that the invention provides novel means for preventing vinyl skin shells from wrinkling or bridging within a retainer mold regardless of whether the shells are at the high or low sides of their manufacturing tolerances.

While but one embodiment of the invention has been shown and described, other modifications thereof are possible within the scope of the following claims.

The embodiments of the invention in which an exclusive property or privilege is claimed are defined as follows:

1. In a retainer mold having a pour mold and a mold cover defining a cavity adapted to receive a vinyl skin shell therein, a plurality of die block assemblies mounted in recesses formed in a surface of said cavity, wherein each die block assembly comprises a retainer plate secured in one of said recesses, and a die block member slidably mounted on said retainer plate for movement within predetermined limits as required to permit the vinyl skin to fit perfectly along said surface between adjacent spaced die block assemblies.

2. In a retainer mold having a pour mold and a mold cover defining a cavity adapted to receive a vinyl skin shell therein, a plurality of die block assemblies mounted in recesses in a surface defining said cavity, wherein each die block assembly comprises a retainer plate secured in one of said recesses, an opening formed in said retainer plate, a die block slidably mounted on said retainer plate and having an extension mounted in said opening with a predetermined clearance between said extension and said opening such that said die block may move as required to allow for a perfect fit of said vinyl skin shell along said surface without wrinkling or bridging.

3. In the retainer mold of claim 2, said extension and said opening are each four-sided in shape.

4. In the retainer mold of claim 2, said extension and said opening are each square in shape.

5. In the retainer mold of claim 2, said die block is generally four-sided in shape.

6. In the retainer mold of claim 2, said respective die blocks are square in shape and located at the approximate centers particular openings to be formed in the finished molded article.

* * * * *